Aug. 31, 1965     C. H. CHRISTENSON     3,203,650
VARIABLE GEOMETRY RE-ENTRY VEHICLE
Filed Aug. 16, 1961     2 Sheets-Sheet 1
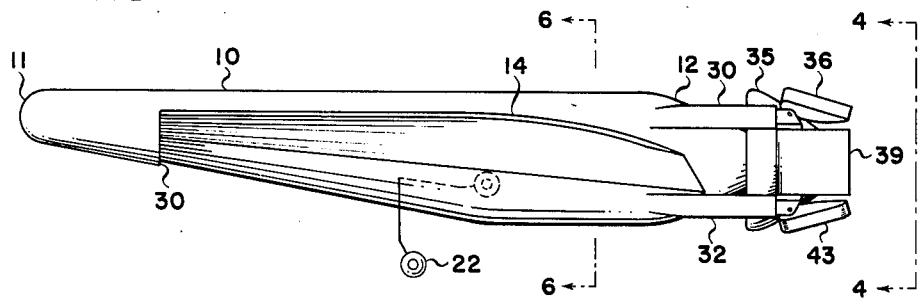
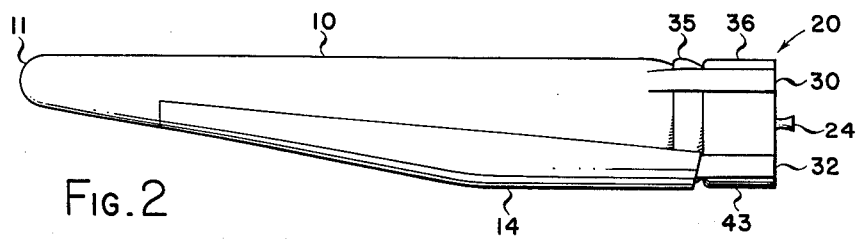
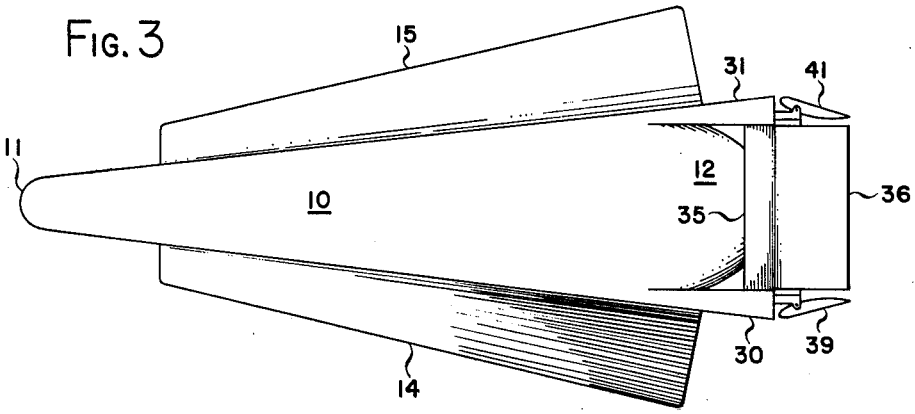
INVENTOR.
CHARLES H. CHRISTENSON
BY
                Agent Aug. 31, 1965　　　C. H. CHRISTENSON　　　3,203,650
VARIABLE GEOMETRY RE-ENTRY VEHICLE
Filed Aug. 16, 1961　　　　　　　　　　　　　　2 Sheets-Sheet 2

INVENTOR.
CHARLES H. CHRISTENSON
BY
Agent

United States Patent Office
3,203,650
Patented Aug. 31, 1965

3,203,650
VARIABLE GEOMETRY RE-ENTRY VEHICLE
Charles H. Christenson, Burbank, Calif., assignor to Lockheed Aircraft Corporation, Burbank, Calif.
Filed Aug. 16, 1961, Ser. No. 131,798
10 Claims. (Cl. 244—46)

The present invention relates to a vehicle for use in space travel which has variable geometry lift means for flight within the atmosphere.

In the art of space travel, it is desirable to provide a vehicle which can be thrust into space and brought back through the atmosphere for a safe landing. Several major problems are encountered. One is concerned with the launch phase, a second is concerned with re-entry and a third with the landing phase.

Means generating high thrust are generally necessary to propel the vehicle beyond the influence of the earth's gravity for launch. The great speeds developed upon launch require that aerodynamic forces on the vehicle and its propulsion means be at a minimum so as to diminish control problems. The forces about the axis in the direction of movement must be balanced as closely as possible.

When the vehicle has arrived in space some means must be provided with which it may maneuver. This is generally provided by some sort of reaction engine such as rocket engines. Rockets are used to cause the re-entry phase to commence. That is, the rockets are directed in order to cause the vehicle to begin its re-entry through the atmosphere. This re-entry causes large heating problems which can be best minimized by a short duration flight through the upper atmospheric layers. This short duration flight can be best arranged by use of a high drag low lift vehicle. After the vehicle has passed through the upper reaches of the atmosphere and into the lower heavier denser regions it begins to slow down. In this area the high drag, low lift characteristic is no longer desirable. In the denser area regions of the atmosphere a high lift and a low drag are desirable.

It can be seen that the configurations for a space vehicle in its various phases are not compatible with each other. In other words a single configuration of a fixed nature will not perform all phases of flight satisfactorily. It is thus contemplated that a variable geometry re-entry or space vehicle is necessary to efficiently accomplish space flight.

One solution to the problem of space travel has been to use a rigid conical shaped body embodying retro-rockets which adequately solves the launch problem and re-entry problem. However, for phases subsequent to the earlier part of the re-entry into the atmosphere, a great deal of inaccuracy is experienced. Because of the great speed above the atmosphere, the re-entry path is a long free fall trajectory with the point of landing not sufficiently precise for consistent, non-destructive recovery. The great speed causes frictional heating problems which cannot be controlled because of the rate of approach to the planet of intended landing is not controlled. Parachutes or other drag devices can be used to slow speed at touchdown but are relatively ineffective in the thinner areas of the atmosphere where the heating problem is at its extreme.

Flight within the atmosphere requires airfoil means of some sort which will support the vehicle and include control means by which the rate of approach to the earth's surface may be regulated and the point of landing selected. These airfoil means are not compatible with the launch or re-entry phase of the flight. The design parameters are further complicated by the desirability of providing a compact, relatively lightweight package which will provide protection for its contents, human or otherwise.

The variable geometry re-entry vehicle contemplated by the present invention consists of a blunt nosed wedge shaped body of substantially delta planform, an inclined lifting surface on the underside of the body, a continuously enlarging cross section on the body from the nose aft, a pair of wings hinged on a fore and aft axis on the sides of the body, means to fold the wings against the underside of the body in a substantially leading edge abutting relationship so that the outer surface of the wings in a folded condition fair with the rest of the body to provide a smooth surface, means to extend the wings to a lateral position for flight, the wings being concave on their underside and extending from a position substantially close to the nose or fore end of the vehicle or body to the aft end, a cowling in the nature of a double ring at the aft end of the body to form a concentric double slotted airfoil to induce an inward flow of air to greatly reduce the base drag at less than hypersonic speed with rail means so that the double ring cowling can be moved from a point adjacent the aft end of the body for hypersonic flight to a point spaced from the body for subsonic flight, a landing wheel hinged on a lateral aixs to the underside of the body and concealed by the wings when they are folded with means to extend the wheel for landing, and directable propulsion means on the aft end of the body for control during the space re-entry and landing phases of flight.

It is an object of the present invention to provide a space vehicle which has variable geometry characteristics able to accomplish all phases of space as well as atmospheric flight including landing with optimum efficiency.

It is another important object of the present invention to provide a vehicle of compact nature for launching into space and aerodynamic support means for flight within the atmosphere which aero-dynamic support means can be folded to reduce size and destabilizing effects for launch and unfolded for flight.

It is another important object of the present invention to provide a space vehicle having a substantially symmetrical launch configuration and a non-symmetrical flight configuration. Airfoils are provided which are folded against the body to provide a wedge shaped vehicle having a small lifting ability but very high drag for reentry phases and which may be extended for high lift and low drag for flight within the atmosphere and landing.

It is another important object of this invention to provide a space vehicle having aerodynamic support surfaces of low weight loading so as to provide a long glide range and lateral maneuverability within the atmosphere.

It is another object of this invention to provide a compact foldable space vehicle of such configuration to provide room and protection for cargo and personnel. The wedge shaped body provides adequate room for one or more capsules for this purpose.

It is another important object of this invention to provide a compact space vehicle which substantially eliminates localized heating problems. Wing vehicle configurations for space or re-entry purposes frequently have heating problems in and around the junction between the wing and the body. The present invention contemplates folding the wings during the phases of space travel during which heating problems are greatest thereby minimizing this effect.

It is another important object of this invention to provide a space vehicle which has a high drag, low lift characteristic but which can be altered to provide a low drag high lift characteristic. A double slotted cowling arrangement at the aft end of the space vehicle is provided which can cause high drag but which may be extended to cause an inner flow of air over the aft end of the body to reduce base drag. This, in conjunction with the previously discussed foldable wings, provides high lift and low drag.

The manner in which the invention may be carried into effect is hereinafter more fully described with reference to the accompanying figures where like numerals indicate like elements.

FIGURE 1 is a side view of the vehicle with wings unfolded, the landing gear extended and the double slotted flow deflecting aft ring extended.

FIGURE 2 is a figure of the vehicle with wings folded and a flow deflecting wing retracted.

FIGURE 3 is a planform view of the vehicle with wings extended.

Figure 4:
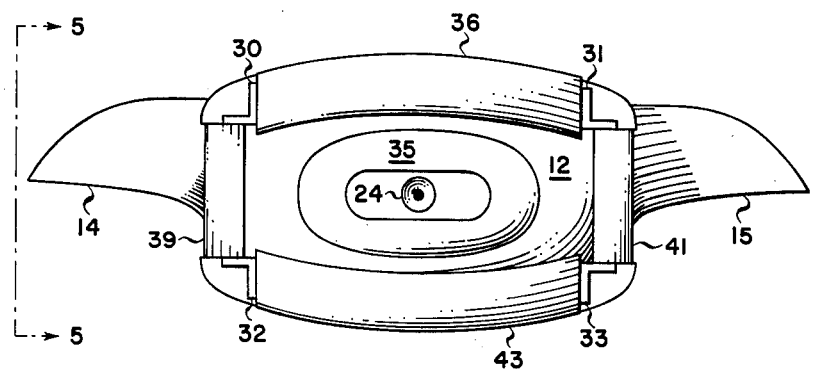
FIGURE 4 is a view taken on lines 4—4 of FIGURE 1.

The variable geometry re-entry vehicle according to the present invention includes a wedge shaped body 10 having a blunt or semi-spherical nose 11 with a continuously enlarging cross section from its nose aft except for a tapered portion 12 at the aft end of the body 10. Wings 14 and 15 provide lift during atmospheric flight but are folded against the underside of the body as shown in FIGURE 2 to provide a low lift, high drag vehicle during the launch, space, and re-entry phases of the flight.

A "double ring" airfoil 20 at the aft end of the body 10 extends to form a double slotted cowling to induce an inward flow of air to greatly reduce the base drag at less than hypersonic speeds. At hypersonic speeds the cowling 20 is retracted against the aft end of the body 10 as shown in FIGURE 2. This provides an extremely high base drag with very little lift, the lift being comprised solely as of the inclined undersurface of body 10. The double slotted flap or cowling 20 may be controlled to provide yaw and pitch control forces. Concealed in the body 10 when the wings 14 and 15 are folded is a landing gear 22 which may be extended for touchdown after re-entry. At the aft end of the body 10 is a reaction motor 24 which may be directed to provide control forces during the space and re-entry phases of the flight as well as some trajectory control during the landing phase.

As can be seen from FIGURES 1, 2 and 3 the underside of body 10 includes an inclined lifting surface even when the wings 14 and 15 are folded against that undersurface. Note that wings 14 and 15 have leading edges which substantially abut on the lower edge of the vehicle when folded. A recess 30 provides a means into which the wings 14 and 15 might be folded to provide a smooth undersurface as shown by FIGURE 2. The body 10 increases in its cross sectional shape from the nose 11 to the beginning of the taper 12 at the aft end. With wings 14 and 15 are folded against the underside of body 10 a near symmetrical shape is formed which is desirable during the launch phase which will probably occur at the nose end of a powerful rocket which will launch it along its longitudinal axis into space. This symmetrical shape will provide a minimum stress and a minimum destabilizing effect upon the vehicle during periods of high acceleration. The wedge shaped thick body configuration provides adequate room for a space capsule and/or fuel cells carried therein. Note that the folded wings provide an additional thickness for protection from heat, meteorite collision or other factors which may endanger the contents of the vehicle. During the slower phases of the flight when the wings 14 and 15 are extended this additional protection will not be necessary.

Wings 14 and 15 are hinged along a fore and aft axis on either side of the body 10. As indicated before they may be folded against the undersides of the body as shown in FIGURE 2 and extended to a position as shown in FIGURES 1 and 3 for flight into the atmosphere. This provides a substantial gull shaped wing with the underside being concave.

Figure 5:
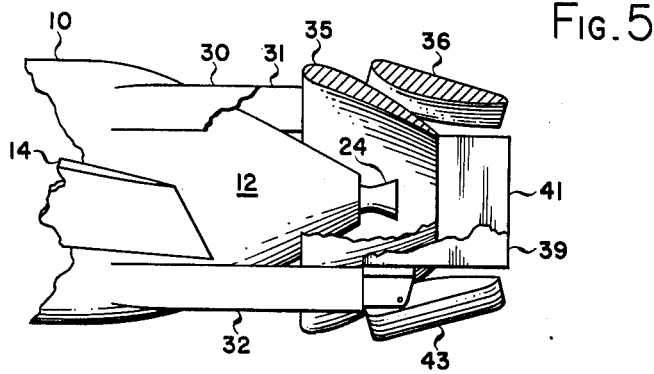
FIGURE 5 is a sectional view with parts broken away on lines 5—5 of FIGURE 4.
Figure 6:
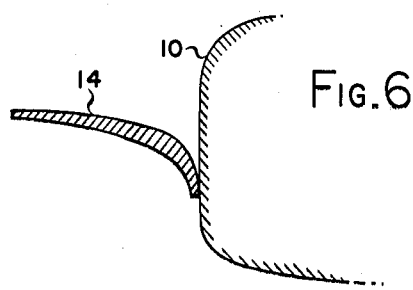
FIGURE 6 is a view taken on lines 6—6 of FIGURE 1.

The "double ring" cowling at the aft end of the body slides fore and aft on a set of four rails located at the four corners of the body as seen from the aft end as in FIGURE 4. The rails 30 and 31 located at the upper outside corners extend aft a short distance having mounted between them a pair of airfoil means 35 and 36. Note that airfoils 35 and 36 are cambered and that their convex surfaces are adjacent each other. The continuous or ring-type airfoil 35 is fixed in its axial orientation with respect to the rails but airfoil 36 may be varied in its angle of attack to provide a degree of a pitch control. In a similar manner an airfoil 39 extends between rails 30 and 32, airfoil 41 extends between rails 31 and 33 and airfoil 43 extends between rails 32 and 33, each being oriented with respect to airfoil 35 in substantially the same manner as the airfoil 36. Airfoils 36, 39, 41 and 43 surround the after extremity of the airfoil 35. The airfoil 43 may be provided with an additional strength member as a part of its surface to provide as a tail skid for the landing phase. The airfoil 35 is fixed to the supporting and is adapted to be translated by the same. The airfoils 36, 39, 41 and 43, in addition to being mounted for translation therewith, are pivotally mounted upon the rails and may be varied to provide pitch and yaw control. As was indicated, means are provided by which the airfoils between each pair of aft extending rails 30 through 33 may be translated from a position lying adjacent the tapered portion 12 of body 10 for a high base drag to the position shown in FIGURES 1, 3 and 5. The resulting formation of concentric double slotted flap, sometimes referred to as a "double ring" cowling, induces an inward flow of air and thereby greatly reduces the base drag at less than hypersonic speeds. A concentric flap arrangement is so configured that it may serve as a variable angle flare for pitch, roll and yaw control at hypersonic speeds and has control surfaces at lower speeds. The tapered portion 12 of body 10 provides an encouragement for the inward flow of air to reduce base drag of the vehicle during the atmospheric flight portions.

The quasi symmetrical body 10 provides for minimum destabilization of the booster vehicle which will launch the re-entry vehicle into space. Due to the large degree of atmospheric maneuverability provided by the vehicle according to the present invention, there is excellent control of landing spot. A three dimensional control during entry and the lack of thin surfaces in planform discontinuity provides for minimum heating problems. The base drag is substantially reduced at subsonic speeds by sliding the double slotted flow deflected ring aft on the heavy rails which promotes an inward flow over the much reduced base area. The outer ring of flaps serves as variable body flare flaps at hypersonic speeds and as control surfaces when opened at low speeds. The lower flap 43 also serves as an aft landing skid. The wings which rotate out from a fore and aft axis increase the wing area by about 70% to thus reduce the landing speed in the range expected from a conventional aircraft thereby facilitating landings on conventional runways. The increased aspect ratio with the wings extended increases the lift slope and thus adds further to the lift drag ratio obtained with the reduced base drag. Further advantages of this lifting body configuration are a maximum atmospheric range and lateral range as compared with the non-wing configuration, and less possibility for localized heating problems and for the wing configuration.

Having described the details of my invention, I claim the following combinations and their equivalents.

I claim:

1. A variable geometry re-entry vehicle having a blunt nosed wedge shaped body of substantially delta planform, an inclined lifting surface on the underside of the body, the body having a continuously enlarging cross section from the nose aft, a double cowling around the fore and aft axis of the body at its aft end, said double cowling being movable from contact with the aft end of the body for supersonic speed to a position spaced from the body for subsonic speed.

2. A variable geometry re-entry vehicle having a blunt nosed wedge shaped body of substantially delta planform, the body having a continuously enlarging cross section from the nose aft, an inner and an outer cowling at the aft end of the body comprised of an inner ring airfoil having a convex surface and a plurality of individual airfoils making up said outer cowling, each said airfoil having a camber and a monvex surface, the convex surface of each said individual airfoil lying adjacent the convex surface of said inner foil, the outer airfoils being controllable to various angles of attack, the inner airfoil being controllable from a position adjacent the aft end of the body for supersonic speed to a position spaced from the body for subsonic speed.

3. A variable geometry re-entry vehicle having a blunt nosed, wedge-shaped body of substantially delta planform with an underside having an inclined lifting surface with a continuously enlarging cross-section from the nose of the body aft, wing means hinged on either side of the body along fore and aft axes, the wings adapted to fold against the underside of the body in a faired position with the rest of the body and to be extended to a lateral flying position, a double cowling at the aft end of the body of substantially the same size as the periphery of the aft end of the body, the double cowling being extendable to form a concentric double slotted flap to induce inward flow of air about the base to reduce drag at subsonic speeds, directable propulsion means on the aft end of the body for control, and landing gear means.

4. A variable geometry re-entry vehicle having a body of wedge shape with substantially delta planform, wing means hinged on a fore and aft axis on either side of the body, the wing means being foldable into the under side of the body and extendable to a lateral position for flight, flap means parallel with the upper and lower aft edges of the body, flap means mounted for movement adjacent the lateral edges of the aft end of the body, the flap means being retractable against the aft end of the body for supersonic flight and extendable away from the body in a spaced relationship for a subsonic flight, the flap means being controllable for pitch and yaw, and landing gear means for landing.

5. A variable geometry vehicle comprising a body having a rearwardly tapered after end, and a pair of axially displaced ring-like airfoils controllably attached to said after end, said airfoils adapted for movement into substantial contact and into spatial relation with said after end of said body and with one another.

6. A variable geometry vehicle comprising a body having a rearwardly tapered after end, and a pair of axially displaced ring-like airfoils controllably attached to said after end, said airfoils movable into substantial contact with said after end of said body for supersonic operation and into spatial relation with said body and with one another for subsonic operation.

7. A variable geometry vehicle comprising a body, and a pair of ring cowlings located adjacent one another at a rearward end of said body, said cowlings comprising a plurality of airfoils, each said airfoil having a cambered surface, said cambered surface of adjacent airfoils being adjacent one another, an outer one of said airfoils being controllable to achieve a desired angle of attack, one of said cowlings being axially movable from a position contacting said rearward end of said body to a position spaced therefrom and the other of said cowlings being movable into spatial relation with said one cowling.

8. A variable geometry vehicle comprising a body, an inner ring cowling adjacent a rearward end of said body and movable axially with respect to said body into controllable spatial relation therewith, said inner ring being cambered on an outer surface thereof, an outer ring cowling adjacently rearward of said inner ring cowling and movable axially with respect to said body and said inner ring cowling into controllable spatial relation with said inner ring cowling, said outer ring cowling being cambered on an inner surface thereof.

9. A variable geometry re-entry vehicle having a blunt nosed wedge shaped body of substantially delta planform, an inclined lifting surface on the underside of the body, the body having a continuously enlarging cross section from the nose aft, a pair of wings attached to the sides of the body on fore and aft axes, a double cowling at the aft end of the body comprised of a forward ring airfoil and a plurality of rearward airfoils, each airfoil being cambered and having a convex surface, said convex surface of each said rearward airfoil lying adjacent said convex surface of said forward ring airfoil, said rearward airfoils being controllable to vary the angle of attack, said ring airfoil being controllable from a position adjacent the body for supersonic speed to a position spaced from the body for subsonic speed, and a plurality of movable rails mounting said airfoils for axial movement relative to said body.

10. A variable geometry re-entry vehicle having a blunt nosed, wedge-shaped body of substantially delta planform, an inclined lifting surface on the underside of the body, the body having a continuously enlarging cross section from the nose aft, a pair of wings hinged to the body on fore and aft axes on the lateral sides of the body extending from a point between the fore and aft end of the body to the aft end, the wings being foldable against the underside of the body in substantially leading edge abutting relationship, the wings being shaped to provide a continuously smooth undersurface on the body when folded, the wings also being extendable to a lateral position and having a concave underside when so extended, a plurality of rails upon the aft end of the body at points about the periphery of the aft end of the body and extending aft a short distance generally parallel with the fore and aft axis of the body, a plurality of airfoils attached to said rails therebetween and about the periphery of the aft end of the body and defining substantially a pair of forward and rearward ring cowlings, each airfoil having a convex surface, the convex surface of each airfoil being adjacent the convex surface of an adjacent airfoil, said rearward cowling being movable to control the space between said ring cowlings and the angle of attack of said rearward cowling, said rails being axially movable to control the space between the aft end of the body and the forward ring cowling immediately adjacent thereto, and propulsion means directed aft on the aft end of the body.

References Cited by the Examiner

UNITED STATES PATENTS

| | | | |
|---|---|---|---|
| 915,972 | 3/09 | Lake | 244—73 |
| 2,284,902 | 6/42 | Hosford | 244—87 X |
| 2,426,086 | 8/47 | Fehr | 244—49 |
| 2,584,826 | 2/52 | Wyckoff | 244—87 X |
| 2,681,773 | 6/54 | Rethorst | 244—36 X |

OTHER REFERENCES

Aviation Week, Nov. 2, 1959, page 103.

FERGUS S. MIDDLETON, *Primary Examiner.*

MILTON BUCHLER, ANDREW H. FARRELL,
*Examiners.*